(12) United States Patent
Lisso et al.

(10) Patent No.: US 10,246,258 B2
(45) Date of Patent: Apr. 2, 2019

(54) ROBOTIC ITEM SORTATION AND OPTIMIZATION ALONG THE VERTICAL AXIS

(71) Applicant: Amazon Technologies, Inc., Seattle, WA (US)

(72) Inventors: Gregory Karl Lisso, Bellevue, WA (US); Steven Klehr, Maple Valley, WA (US); Sean Maylone, Seattle, WA (US); Vignesh Kumar Sivasamy, Bellevue, WA (US); Samuel Christopher Uhlman, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 153 days.

(21) Appl. No.: 15/295,040

(22) Filed: Oct. 17, 2016

(65) Prior Publication Data
US 2018/0105363 A1 Apr. 19, 2018

(51) Int. Cl.
| | |
|---|---|
| *B65G 11/06* | (2006.01) |
| *B65G 17/00* | (2006.01) |
| *B65G 21/20* | (2006.01) |
| *B65G 47/90* | (2006.01) |
| *B65G 47/64* | (2006.01) |

(Continued)

(52) U.S. Cl.
CPC .......... *B65G 11/063* (2013.01); *B65G 1/1373* (2013.01); *B65G 17/00* (2013.01); *B65G 21/2072* (2013.01); *B65G 47/643* (2013.01); *B65G 47/71* (2013.01); *B65G 47/844* (2013.01); *B65G 47/90* (2013.01)

(58) Field of Classification Search
USPC ........................................................ 700/223
See application file for complete search history.

(56) References Cited

U.S. PATENT DOCUMENTS

| | | | |
|---|---|---|---|
| 5,478,183 A | * 12/1995 | Savigny | B65G 1/0435 186/49 |
| 2002/0067984 A1 | 6/2002 | Guenzi et al. | |

(Continued)

FOREIGN PATENT DOCUMENTS

| | | |
|---|---|---|
| DE | 20006059 U1 | 12/2000 |
| DE | 102008037658 A1 | 2/2010 |

(Continued)

OTHER PUBLICATIONS

International Search Report and Written Opinion for PCT/US2017/056172, dated Jan. 8, 2018.

(Continued)

*Primary Examiner* — Kyle O Logan
(74) *Attorney, Agent, or Firm* — Thomas | Horstemeyer, LLP

(57) ABSTRACT

Disclosed are various embodiments for robotic item sortation and optimization along the vertical axis in a conveyor-based system. A robotic system may be mounted above or adjacent to a conveyor system that moves items along a conveyor belt or similar device. Once an item is laterally diverted from the conveyor system, the robotic system may collect the item at a respective holding station and move the item along a vertical axis for placement in one of a plurality of vertically-configured item handling devices.

22 Claims, 10 Drawing Sheets

(51) Int. Cl.
*B65G 47/71* (2006.01)
*B65G 47/84* (2006.01)
*B65G 1/137* (2006.01)

(56) References Cited

U.S. PATENT DOCUMENTS

2008/0181753 A1* 7/2008 Bastian ............ B65G 1/026
 414/277
2015/0032252 A1* 1/2015 Galluzzo ............ B25J 5/007
 700/218

FOREIGN PATENT DOCUMENTS

| | | |
|---|---|---|
| GB | 2366561 A | 3/2002 |
| JP | H05286554 A | 11/1993 |
| WO | 2010022832 A1 | 3/2010 |
| WO | 2014130937 A1 | 8/2014 |

OTHER PUBLICATIONS

Miller, Multi Channel Accumulation Concept, http://www.ambaflex.com/products/accuveyor-avx/ retrieved on Oct. 13, 2014.
Bastian Solutions, "Automated Storage & Retrieval Systems (ASRS)", http://www.bastiansolutions.com/automation/automated-storage-retrieval-systems-(asrs)/unit-load-asrs retrieved on Oct. 13, 2014.

* cited by examiner

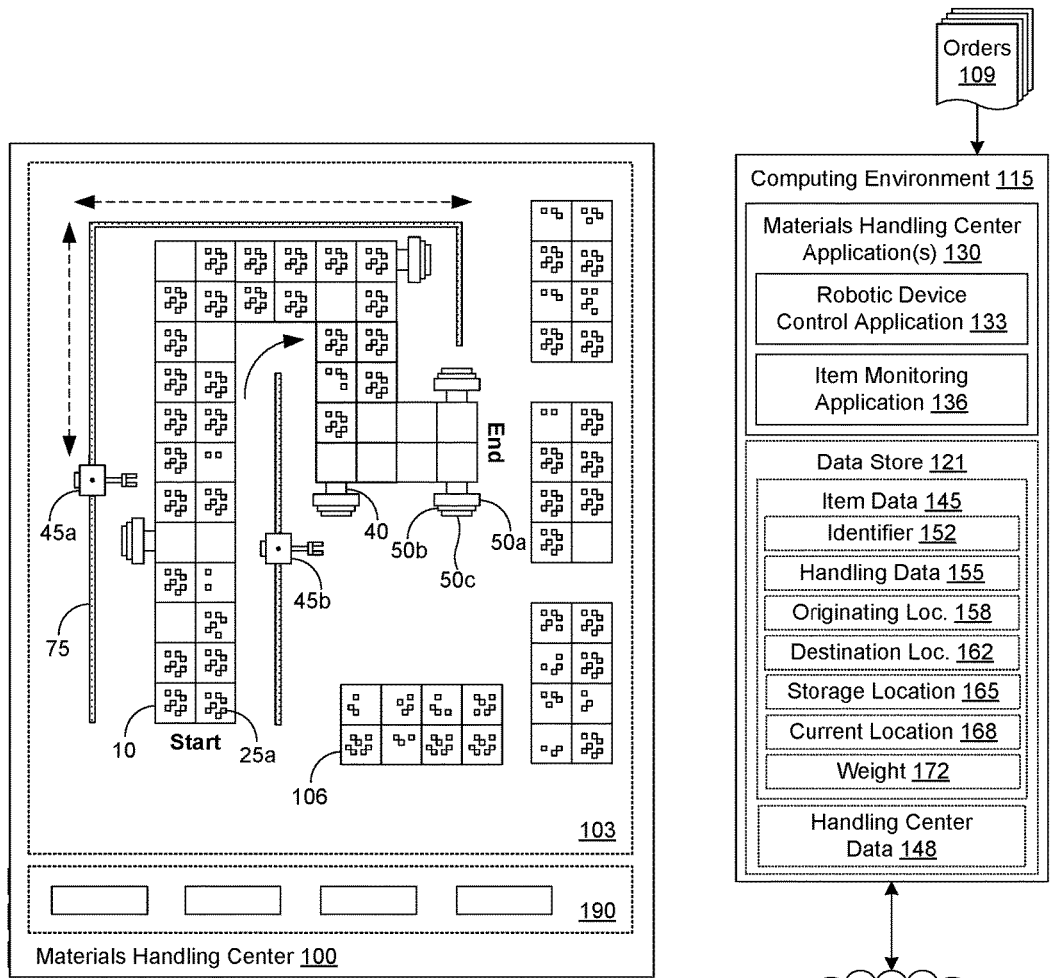
FIG. 6
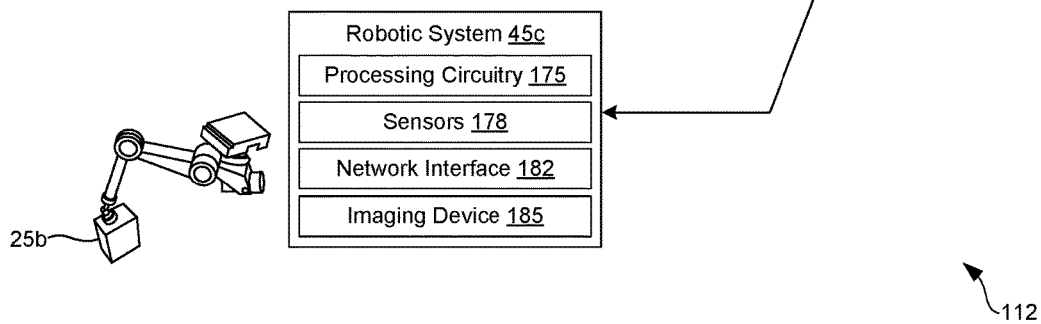

ROBOTIC ITEM SORTATION AND OPTIMIZATION ALONG THE VERTICAL AXIS

BACKGROUND

A fulfillment center is a materials handling facility that is equipped to store inventory and fulfill orders from the inventory. A variety of tasks may be performed in the fulfillment center including, for example, receiving shipments of new inventory, storing new inventory in storage locations, picking items from the inventory storage locations in response to receiving orders, grouping the picked items, packing the items, and readying the packed items for shipment.

Some fulfillment centers include a conveyor for moving items from one location to another, as well as for sorting the items by moving the items to various destination locations. These conveyors typically move an item along a first directional axis until the item reaches a destination location. Thereafter, a diverting mechanism moves the item laterally to the destination location by moving the item along a second directional axis. However, these conveyor systems use a large amount of space and optimizing conveyor systems remains problematic.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 6 is a drawing of a networked environment according to various embodiments of the present disclosure.

DETAILED DESCRIPTION

The present disclosure relates to robotic item sortation and optimization along the vertical axis in a conveyor-based system and other like systems. Within materials handling facilities, packages or other items may be transported by various types of conveyor systems that utilize different mechanisms to move, sort, divert, or align packages. These mechanisms may include sorters, such as shoe sorters, cross belt sorters, tilt tray sorters, pop-up wheel diverts, right angle transfers, steering wheel diverts, swing arms, pushers, modular belt diverts, and other sorters. Each of these mechanisms has advantages and disadvantages related to cost, speed, complexity, reliability, materials to be handled entitlement, and space utilization. While existing conveyor systems move and sort items at a high rate of speed, demand exceeds the capabilities of state of the art systems.

Various embodiments of the present disclosure introduce a system for robotic item sortation and optimization along the vertical axis for use with conveyor-based systems. In one embodiment, a system may include a conveyor system that moves items from a first location to a second location and laterally diverts the items to one of a multitude of holding stations. The system may include a robotic system that includes an articulated robotic arm mounted above or lateral to the conveyor system being configured to collect the items at the holding stations and move the items vertically along the Z-axis for placement in one of a multitude of vertically-configured item handling devices.

As items can be diverted vertically using a robotic system, utilization of traditionally conveyor systems and item sorters may be optimized. For instance, a given materials handling center may accomplish a higher throughput of items despite limited space and without having to replace legacy conveyor systems. Additionally, faster order processing times may be provided to consumers.

In the following discussion, a general description of a system for robotic item sortation and optimization along the vertical axis and its components is provided, followed by a discussion of the operation of the same.

Figure 1:
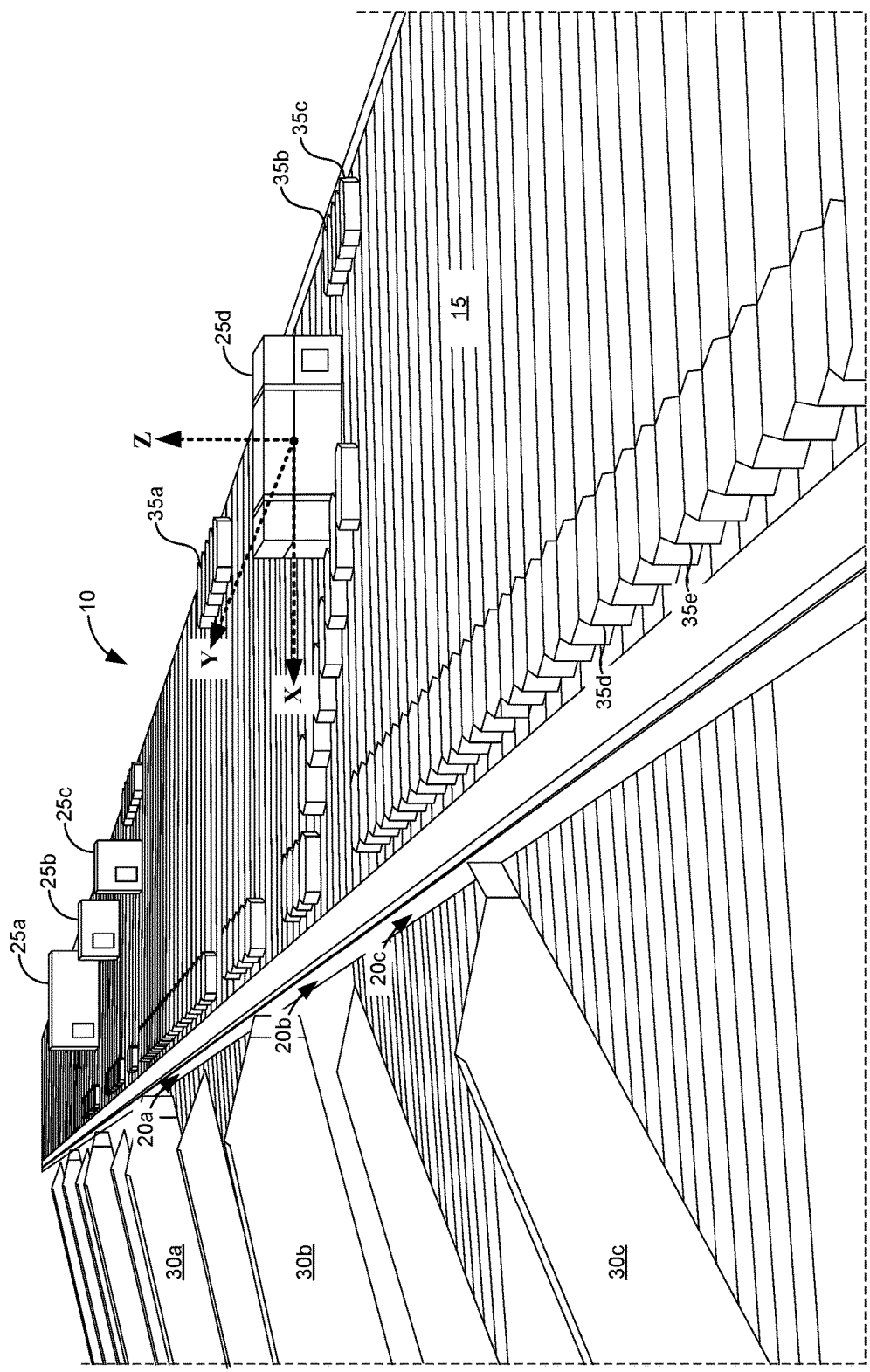
FIG. 1 is a drawing of a conveyor system according to various embodiments of the present disclosure.

With reference to FIG. 1, shown is a perspective view of a conveyor system 10 that may be implemented in a materials handing facility according to various embodiments, as will be described. The conveyor system 10 includes a conveyor belt 15 and exit points 20a . . . 20c (collectively "exit points 20"). The conveyor belt 15 may include a belt conveyor, a lineshaft roller conveyor with a plurality of rollers, a chain conveyor, or any other conveyor system that advances items 25a . . . 25d (collectively "items 25") from one location to another. At an exit point 20, one or more of the items 25 may be laterally diverted from the conveyor belt 15 into one of a multitude of item handling devices 30a . . . 30c (collectively "item handling devices 30"). The item handling devices 30 may include, for example, chutes, spirals, ramps, other conveyor belts 15, or other suitable item handling devices 30, as may be appreciated. For example, in the embodiment of FIG. 1, a chute may receive the item 25 at an exit point 20, where the item 25 falls down the chute for collection by personnel of the materials handling center, or for subsequent processing.

An item 25 may include a product, a package, a box, a tote, a mailer, a bucket, or other types of containers. The item 25 may bear one or more identifiers, such as bar codes, quick response (QR) or matrix codes, radio-frequency identifiers (RFIDs), or other forms of identifiers. To this end, in some embodiments, a conveyor system 10 may include one or more imaging devices or RFID readers that track items 25 as they progress through the conveyor system 10 by detecting one or more identifiers associated with the items 25. In some examples, the identifiers may be detected from a shipping label.

In the example shown in FIG. 1, the item 25 may be laterally diverted from the conveyor belt 15 to an exit point 20 using one or more lateral diverting mechanisms, such as one or more shoe diverting mechanism 35a . . . 35e (collectively "shoe diverting mechanisms 35") that push or otherwise force an item 25 to an exit point 20. In other embodiments, other lateral diverting mechanisms may be employed to push, pull, or otherwise guide items 25 to an exit point 20. For example, other lateral diverting mechanisms may include a pop-up-steering-wheel diverting mechanism, a tilt tray diverting mechanism, a push-up arm diverting mechanism, a roller belt diverting mechanism, a cross belt diverting mechanism, a right angle transfer, a steering wheel diverting mechanism, a swing arm diverting mechanism, a pusher diverting mechanism, a modular belt diverting mechanism, and other similar mechanisms.

During operation, the conveyor belt 15 may be described as moving items 25 along a first directional axis (e.g., the Y-axis) where lateral diverting mechanisms, such as the shoe diverting mechanisms 35, move the items 25 horizontally or laterally along a second directional axis (e.g., the X-axis). Providing the capability of moving items 25 along a third directional axis (e.g., the Z-axis) may improve performance of the conveyor system 10, as will be described.

Figure 2A:
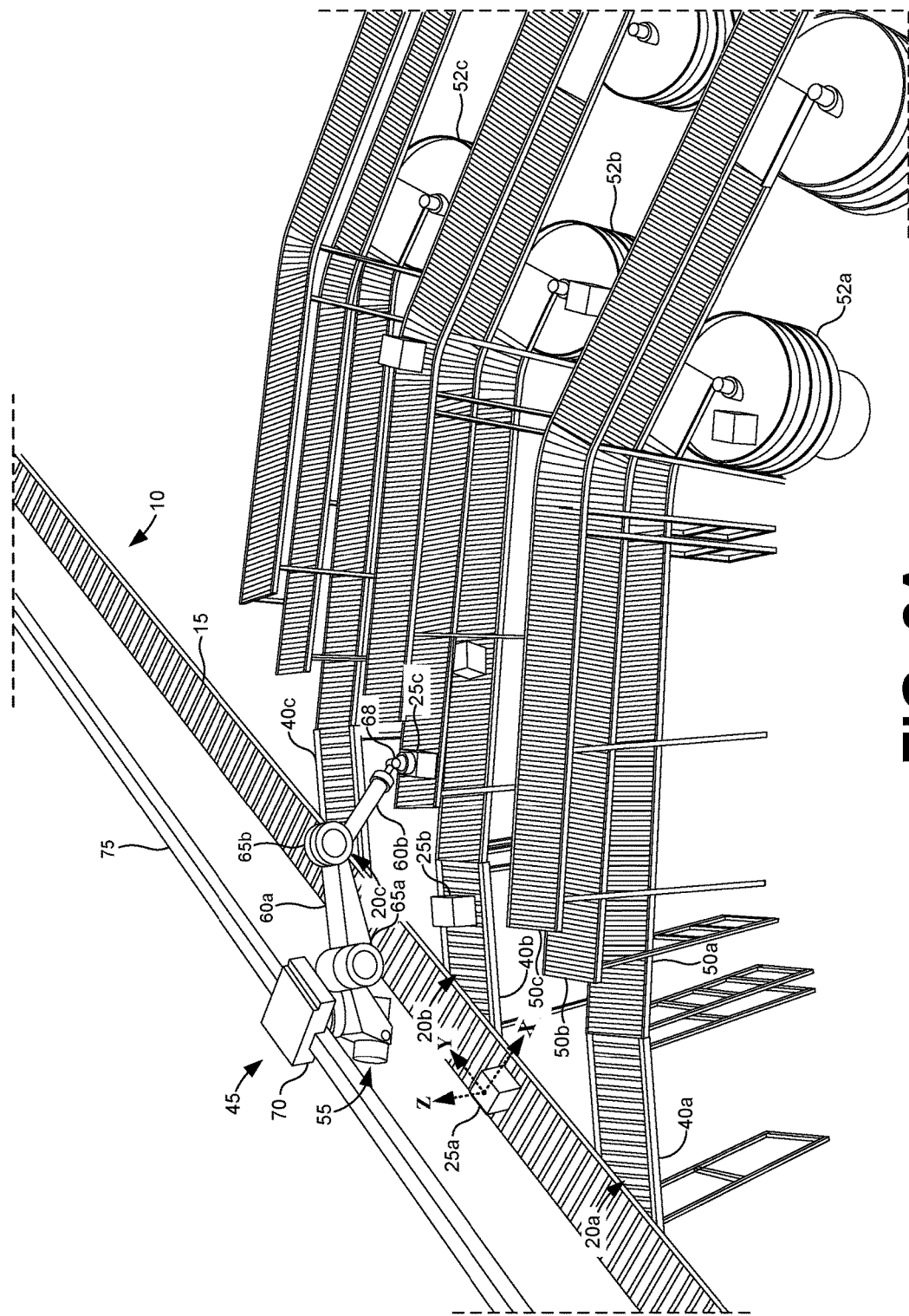
FIGS. 2A, 2B, 3A, 3B, and 4 are drawings of a robotic system for vertically redirecting items in a conveyor system according to various embodiments of the present disclosure.
Figure 2B:
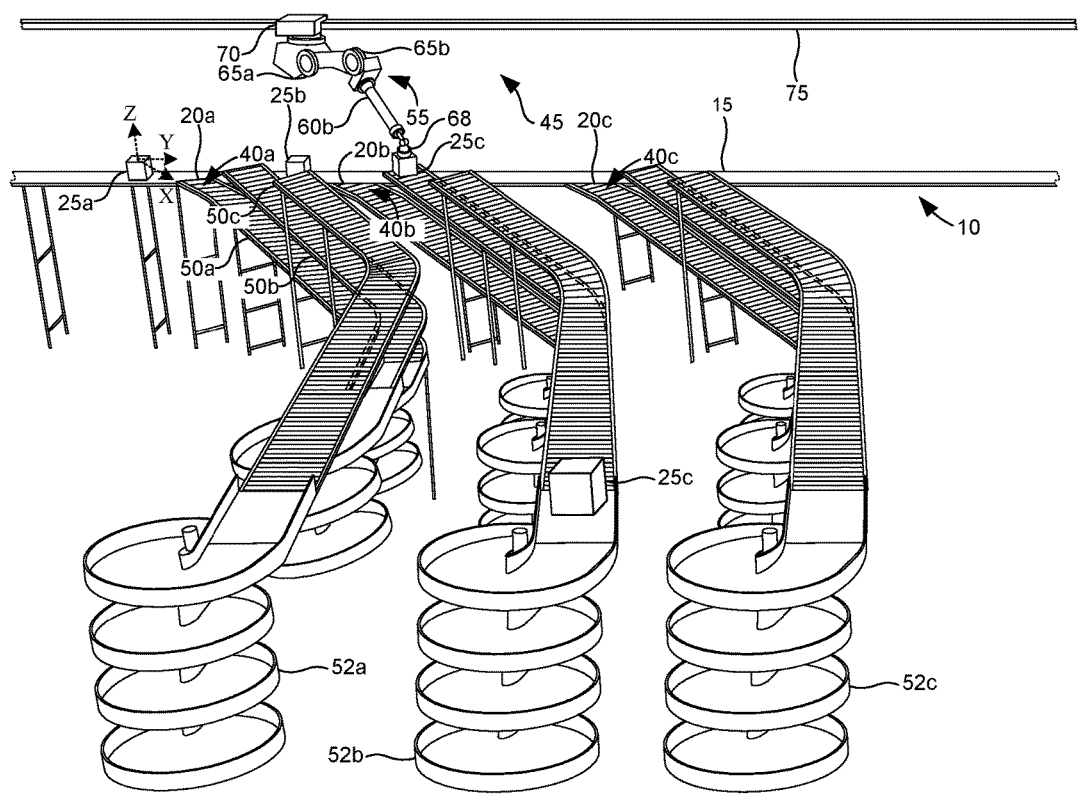

Referring next to FIGS. 2A and 2B, an embodiment of a system for robotic item sortation and optimization along a vertical axis and its components is shown. As discussed above with respect to FIG. 1, a conveyor system 10 may employ a conveyor belt 15 to move items 25 along a first axis (e.g., the Y-axis). Once an item 25 reaches a particular location along the conveyor system 10, a lateral diverting mechanism moves the item 25 along a second axis to an exit point $20a \ldots 20c$, which causes the item 25 to be received at one of a multitude of holding stations $40a \ldots 40c$ (collectively "holding stations 40") positioned along the conveyor system 10. In some embodiments, a holding station 40 includes a substantially level platform configured to retain an item 25 in a resting state such that it may be collected by a robotic system, as will be discussed. This may be contrasted with chutes, spirals, ramps, or other item handling devices 30 that may be angled downwards to cause the item 25 to continue movement as soon as it is laterally diverted from the conveyor belt 15.

When an item 25 is received at a holding station 40, a robotic system 45 may collect the item 25 to move the item 25 by at least vertically adjusting the item 25. For example, the robotic system 45 may vertically move the items 25 along a third axis (e.g., the Z-axis) for placement in one of a multitude of vertically-configured item handling devices $50a \ldots 50c$ (collectively "vertically-configured item handling devices 50"). The robotic system 45 may collect an item 25 for placement on one of a first vertically-configured item handling device 50a, a second vertically-configured item handling device 50b, or a third vertically-configured item handling device 50c. The vertically-configured item handling devices 50 may be described as having different heights, denoted by $H_1$, $H_2$, and $H_3$ where:

$$H_3 > H_2 > H_1 \qquad \text{(eq. 1)}.$$

As each of the vertically-configured item handling devices 50 has a region with a height varied from another vertically-configured item handling devices 50, the arrangement of the vertically-configured item handling devices 50 may be described as substantially overlapping, vertically stacked, or tiered.

In the non-limiting example of FIGS. 2A and 2B, the vertically-configured item handling devices 50 are shown as lineshaft roller conveyors positioned at different heights along the Z-axis having, for example, rollers that cause the item 25 to slide down a ramp. As may be appreciated, when an item 25 is placed on one of the vertically-configured item handling devices 50 by the robotic system 45, the items 25 may slide, roll, or otherwise move in a direction for collection or subsequent processing. In the example of FIGS. 2A and 2B, the items 25 may slide down one of the ramps into a respective one of the spirals $52a \ldots 52c$ (collectively "spirals 52"). As the vertically-configured item handling devices 50 are tiered, stacked vertically, and overlap, additional processing space is provided with minimal use of floor space.

The robotic system 45 may include hardware and software components necessary to relocate the item 25 from the holding station 40 to one of the vertically-configured item handling devices 50. To this end, the robotic system 45 may include, for example, an elevator, escalator, angled conveyor belt 15, or other similar device. In the non-limiting example of FIGS. 2A and 2B, the robotic system 45 includes a robotic arm 55. The robotic arm 55 may include an articulated electro-mechanical arm having one or more links $60a \ldots 60b$ (collectively "links 60") connected by joints $65a \ldots 65b$ (collectively "joints 65") allowing either rotational motion or translational displacement of an item 25. In various embodiments, the robotic arm 55 may provide six degrees-of-freedom (6DoF). The robotic arm 55 may further include an end effector 68 capable of securing an item 25 and releasing the item 25 after movement along the Z-axis. Operation of the robotic arm 55 may be controlled by processing circuitry, as will be described.

Additionally, the robotic arm 55 may include a robotic arm base 70 configured to slide horizontally along a rail 75 to retrieve items 25 at different locations along the conveyor belt 15. While the robotic system 45 of FIGS. 2A and 2B is shown as being mounted above the conveyor system 10 in an overhead arrangement, in other embodiments, the robotic system 45 may be positioned adjacent or lateral to the conveyor system 10 or at another suitable location. For instance, a robotic system 45 may be positioned adjacent to each handling station 40 or exit point 20, if desired. Additionally, use of a holding station 40 may be optional. For example, in various embodiments, a robotic system 45 may include a robotic arm 55 or similar mechanism capable of picking items 25 directly from the conveyor system 10 for placement in one of the vertically-configured item handling devices 50.

As items 25 are capable of being moved vertically using embodiments of the robotic system 45, utilization of traditional conveyor systems 10 and item sorters may be augmented. For instance, a given materials handling center may accomplish a higher throughput of items despite limited space and without having to replace legacy conveyor systems 10 by implementing vertically-configured item handling devices 50.

Figure 3A:
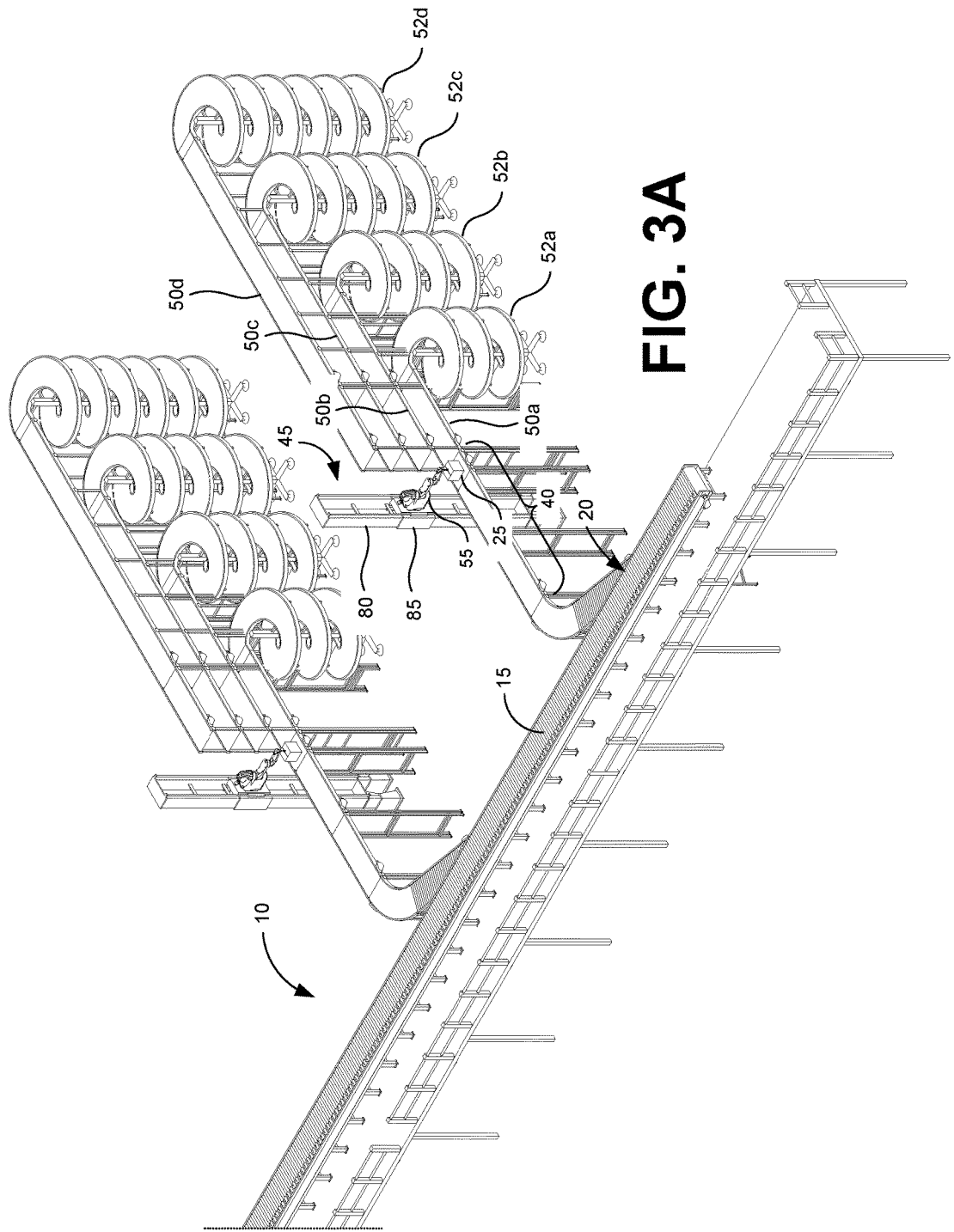
Figure 3B:
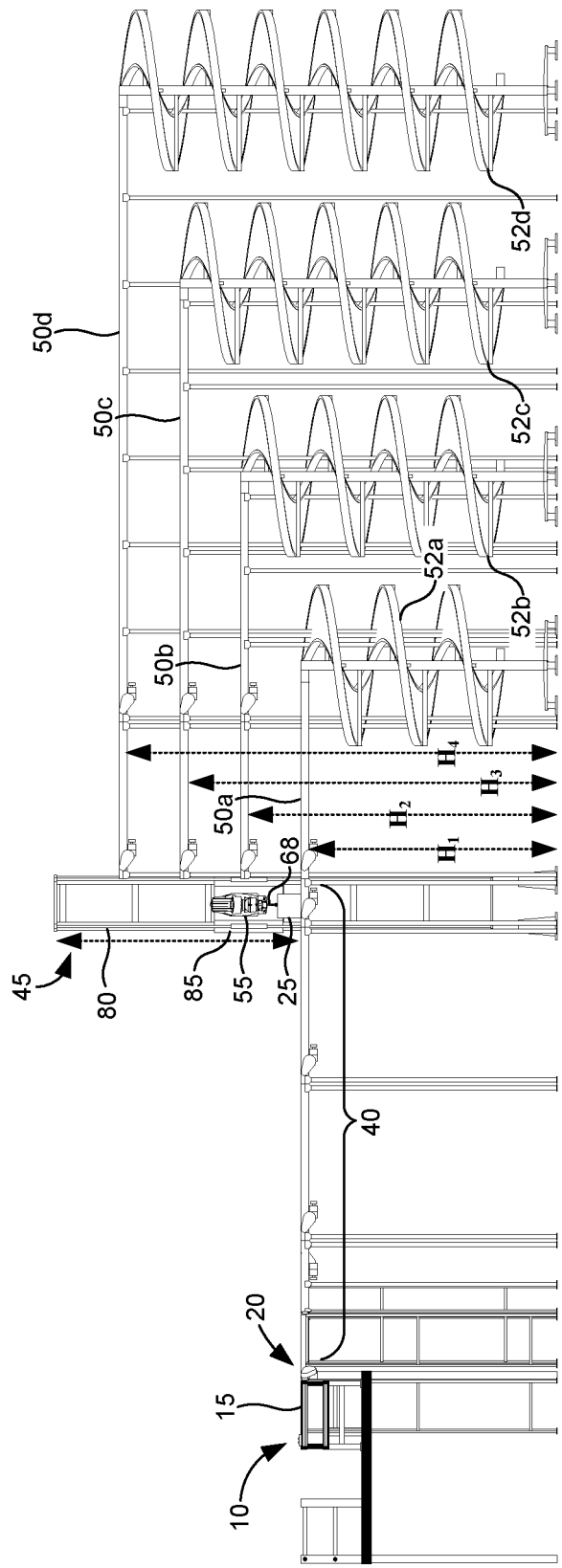

Turning now to FIGS. 3A and 3B, another embodiment of a system for robotic item sortation and optimization along a vertical axis and its components is shown. Once an item 25 reaches a particular location along the conveyor system 10, a lateral diverting mechanism may be employed to move the item 25 along a second axis to an exit point 20, which causes the item 25 to be received at a holding station 40 positioned along the conveyor system 10 where the item 10 is able to be retrieved by a robotic system 45. Similar to the holding stations 40 shown in FIGS. 2A and 2B, the holding station 40 in the embodiment of FIGS. 3A and 3B includes a substantially level platform configured to retain an item 25 in a state such that it may be collected by the robotic system 45.

The robotic system 45 may collect the item 25 at the holding station 40 to relocate the item 25 to one of the multitude of vertically-configured item handling devices $50a \ldots 50d$. For example, the robotic system 45 may vertically move the items 25 along a third axis (e.g., the Z-axis) for placement in one of a first vertically-configured item handling device 50a, a second vertically-configured item handling device 50b, a third vertically-configured item handling device 50c, or a fourth vertically-configured item handling device 50d. The vertically-configured item handling devices 50 may be described as having different heights, denoted by $H_1$, $H_2$, $H_3$, and $H_4$ where:

$$H_4 > H_3 > H_2 > H_1 \qquad \text{(eq. 2)}.$$

In other words, each of the vertically-configured item handling devices 50 may be described having different vertical offsets from the holding station 40.

The vertically-configured item handling devices 50 may include lineshaft roller conveyors, or other types of conveyors, positioned at different heights along the Z-axis having, for example, rollers that cause the item 25 to advance to one of a multitude of spirals 52a . . . 52d. As may be appreciated, when an item 25 is placed on one of the vertically-configured item handling devices 50 by the robotic system 45, the items 25 may slide, roll, or otherwise move in a direction for collection or subsequent processing. As the vertically-configured item handling devices 50 shown in FIGS. 3A and 3B are stacked vertically and overlap, additional processing space is provided by utilizing available space in the vertical direction.

The robotic system 45 of FIGS. 3A and 3B is shown as including a stationary frame 80, a moveable frame 85, and a robotic arm 55 mounted on the moveable frame 85, also referred to as a gantry robotic arm. As may be appreciated, the robotic system 45 may include one or more actuators to cause the moveable frame 85 (and the robotic arm 55 mounted thereon) to move along the stationary frame 80, for example, in an upwards or downwards direction, to move the item 25 from the holding station 40 to one of the vertically-configured item handling devices 50. The robotic arm 55 may include an articulated electro-mechanical arm similar to that on FIGS. 2A and 2B, or may include a Cartesian or linear robotic arm 55. To this end, the robotic arm 55, or the robotic system 45 and its components, may be configured to move along one or more axes. In one embodiment, the robotic arm 55 includes a selective compliance assembly robotic arm (SCARA) having a 4-axis movement capability. In other embodiments, the robotic system 45 may have a 6-axis movement capability. The robotic arm 55 may further include an end effector 68 capable of securing an item 25 and releasing the item 25 after movement along the Z-axis.

Operation of the robotic arm 55 may be controlled by processing circuitry, as will be described. While the robotic system 45 of FIGS. 3A and 3B is shown as being mounted adjacent to the holding station 40, in other embodiments, the robotic system 45 may include a gantry robotic arm mounted above the holding station 40 or in any other appropriate location capable of moving items 25 to the vertically-configured item handling devices 50.

Figure 4:
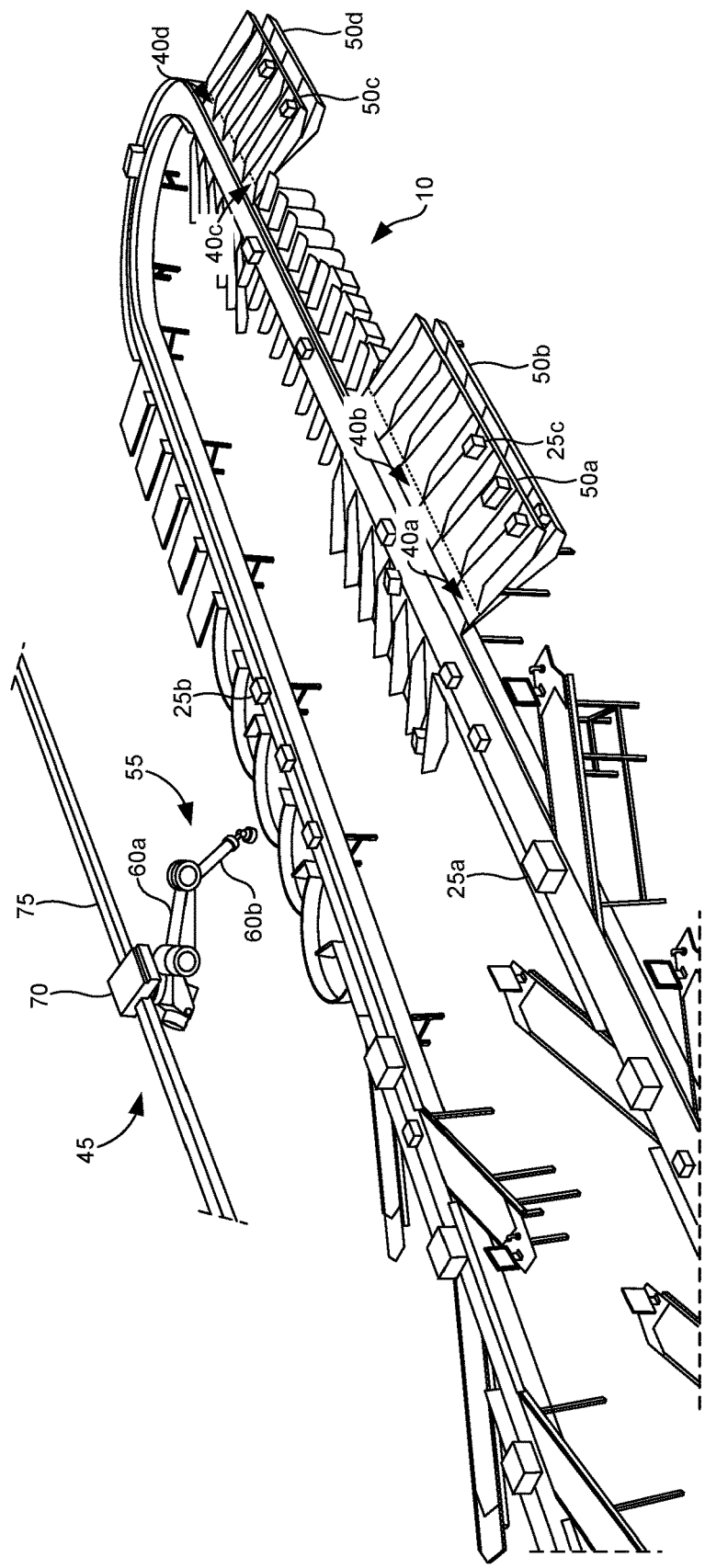

Moving on to FIG. 4, another embodiment of a system for robotic item sortation and optimization along a vertical axis and its components is shown. As discussed above with respect to FIGS. 2A, 2B, 3A, and 3B, the robotic system 45 may collect the item 25 to move the item 25 by at least vertically adjusting the item 25 when an item 25 is located at a holding station 40. For example, the robotic system 45 may vertically move the items 25 along a third axis (e.g., the Z-axis) for placement in one of the vertically-configured item handling devices 50a . . . 50d.

In the non-limiting example of FIG. 4, the vertically-configured item handling devices 50 are shown as overlapping chutes positioned at different heights along the Z-axis. As may be appreciated, when an item 25 is placed on one of the vertically-configured item handling devices 50 by the robotic system 45, the items 25 may slide down one of the chutes where the items 25 may be collected by personnel of the materials handling center. As the vertically-configured item handling devices 50 are tiered or stacked vertically, additional processing space is provided with minimal use of floor space.

As noted above, the robotic system 45 may include a robotic arm 55 having a multitude of links 60a . . . 60b connected by joints 65a . . . 65b that provide rotational motion or translational displacement of an item 25 when handled by a suitable end effector 68. Additionally, the robotic arm 55 may include a robotic arm base 70 configured to slide horizontally along a rail 75 to retrieve items 25 at different locations along the conveyor belt 15. For example, to navigate to different areas of the conveyor system 10, the robotic base 70 may include one or more actuators that cause the robotic arm 55 to move along the rail 75 mounted above the conveyor system 10.

Figure 5A:
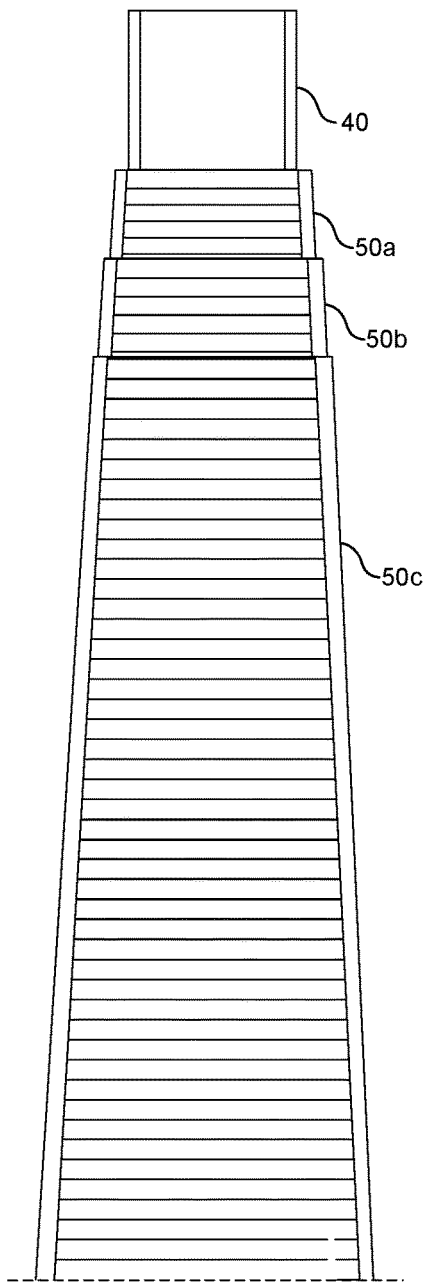
FIGS. 5A and 5B are drawings showing a top perspective view and a top plan view of vertically-configured item handling devices according to various embodiments of the present disclosure.

Moving on to FIG. 5A, a top perspective view of a multitude of vertically-configured item handling devices 50a . . . 50c is shown according to various embodiments. In the non-limiting example of FIG. 5A, a first vertically-configured item handling device 50a is shown as a bottom-most of the multitude of the vertically-configured item handling devices 50, while a second vertically-configured item handling device 50b is located between the first vertically-configured item handling device 50a and a third vertically-configured item handling device 50c. The third vertically-configured item handling device 50c is shown as the top-most of the vertically-configured item handling devices 50.

Figure 5B:
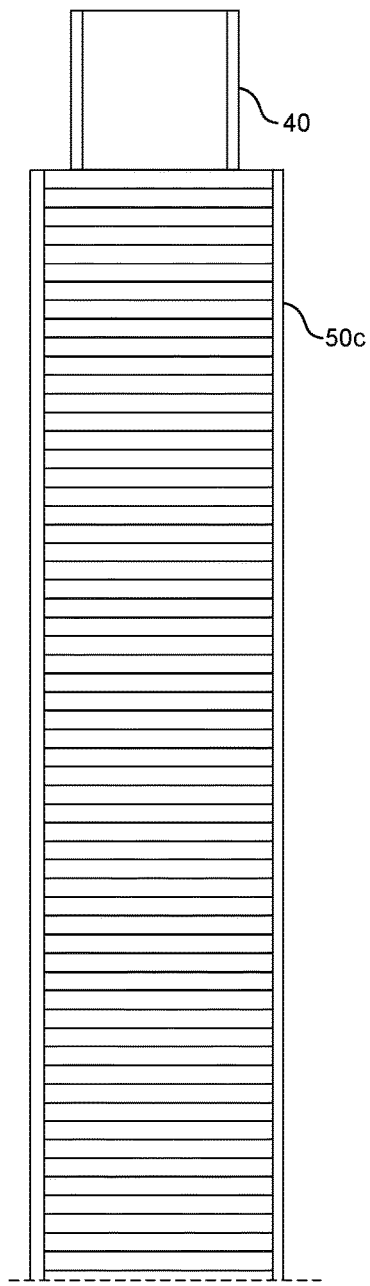

Each of the vertically-configured item handling devices 50 may be described as having a different offset from a holding station 40. For instance, the first vertically-configured item handling device 50a may be flush with the holding station 40, while the second and third vertically-configured item handling devices 50b and 50c have larger offsets. As the third vertically-configured item handling device 50c is shown as the top-most of the vertically-configured item handling devices 50, it may be described as having the largest offset from the holding station 40. In other words, each of the vertically-configured item handling devices 50 may be described as having a height different than other ones of the vertically-configured item handling devices 50. Additionally, as shown in the top plan view of FIG. 5B, each of the vertically-configured item handling devices 50 may be described as overlapping a substantial portion of other ones of the vertically-configured item handling devices 50 to save space in a materials handling center by providing a multitude of vertically-configured item handling devices 50 arranged in the vertical direction. While FIGS. 5A and 5B show three vertically-configured item handling devices 50, it is understood that any number of vertically-configured item handling devices 50 may be employed if space permits.

Turning now to FIG. 6, shown is a drawing that depicts one example of a materials handling center 100 according to an embodiment of the present disclosure. A materials handling center 100 may include, but is not limited to, a warehouse, distribution center, cross-docking facility, order fulfillment center (also referred to as a "fulfillment facility"), packaging facility, shipping facility, or other facility or combination of facilities for performing one or more functions of material or inventory handling. Although the materials handling center 100 is described herein with specific reference to a fulfillment center, it is understood that a materials handling center 100 provides one example of many other types of environments to which the principles described herein apply.

According to the illustration provided herein, the materials handling center 100 may comprise, for example, a large warehouse or other structure that includes an inventory storage area 103 having a plurality of inventory locations 106 and a conveyor system 10 used to move items 25a . . . 25c throughout the materials handling center 100. The inventory locations 106 are generally locations configured for the storage of items 25. To this end, the inventory locations 106 may include, for example, bins, slots, shelves, containers, receptacles, crates, stalls, cribs, cordoned areas, hooks, racks, or other locations while the conveyor system 10 may include conveyor belts 15, actuators, rollers, or other components that advance an item 25 from one location to another. The materials handling center 100 may be configured to provide fulfillment of orders 109 received for the items 25 that are purchased, rented, leased or otherwise consumed or requested.

The items 25 may comprise, for example, products that are purchased or requested by consumers through various channels with or without a package, a box, a tote, a mailer, a bucket, or other type of container. Such products may be any type of product that can be purchased and delivered to customers such as, for example, clothing items, retail goods, hardware, electronics, toys, media items, or any other product. In various embodiments, the items 25 fulfilled in the materials handling center 100 may be purchased over an electronic commerce system.

Associated with the materials handling center 100 is a networked environment 112 that orchestrates the operation of the materials handling center 100 in fulfilling orders 109 for the purchase of items 25 or, alternatively, for the movement of items 25 to other materials handling centers 100. The networked environment 112 includes a computing environment 115 and a robotic system 45a . . . 45c which are in data communication with each other via a network 118. The network 118 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 115 may include, for example, a server computer or any other system providing computing capability. Alternatively, the computing environment 115 may employ a plurality of computing devices that may be arranged, for example, in one or more server banks or computer banks or other arrangements. Such computing devices may be located in a single installation or may be distributed among many different geographical locations. For example, the computing environment 115 may include a plurality of computing devices that together may comprise a hosted computing resource, a grid computing resource and/or any other distributed computing arrangement. In some cases, the computing environment 115 may correspond to an elastic computing resource where the allotted capacity of processing, network, storage, or other computing-related resources may vary over time.

Various applications and/or other functionality may be executed in the computing environment 115 according to various embodiments. Also, various data is stored in a data store 121 that is accessible to the computing environment 115. The data store 121 may be representative of a plurality of data stores 121 as can be appreciated. The data stored in the data store 121, for example, is associated with the operation of the various applications and/or functional entities described below.

The components executed on the computing environment 115, for example, include various materials handling center applications 130 and other applications, services, processes, systems, engines, or functionality not discussed in detail herein. The materials handling center applications 130 may include applications that control or assist with operations of the materials handling center 100. According to various embodiments of the present disclosure, the materials handling center applications 130 include, for example, a robotic device control application 133 and an item monitoring application 136.

The robotic device control application 133 is executed to control operations of robotic systems 45 implemented in the materials handling center 100. The robotic systems 45 may include robotic arms 55, elevators, escalators, angled conveyors, or other like systems. In embodiments in which a robotic system 45 includes a robotic arm 55, the robotic device control application 133 may maintain data pertaining to forward kinematics of the robotic arm 55 in the data store 121. For instance, the robotic device control application 133 may maintain a spatial model of the robotic arm 55 to facilitate movement of the robotic arm 55, as well as collection and relocation of items 25.

In further embodiments, the robotic device control application 133 applies the Denavit-Hartenberg (DH) convention to maintain spatial references for links 60, joints 65, or other components of a robotic arm 55. To this end, the robotic device control application 133 may maintain DH parameters in the data store 121 which may include four parameters that maintain reference frames for each of the links 60 of the robotic arm 55. By knowing the parameters for each of the links 60 of the robotic arm 55, the position and orientation of the end effector 68 may be determined.

The item monitoring application 136 is executed to maintain a virtual location of items 25 that correspond to their physical location in the materials handling center 100. In some embodiments, the materials handling center 100 includes one or more imaging devices that capture and process images of identifiers that uniquely identify the items 25. The virtual location for an item 25 may be updated based on detection of an identifier corresponding to that item 25 at a particular location in the materials handling center 100 or, more specifically, along the conveyor system 10.

The data stored in the data store 121 includes, for example, item data 145, handling center data 148, and potentially other data. The item data 145 may include, for example, data pertaining to an item 25 in the materials handling center 100. To this end, item data 145 may include, for example, an identifier 152, handling data 155, an originating location 158, a destination location 162, a storage location 165, a current location 168, a weight 172, as well as other data.

The handling center data 148 may include, for example, data used to control operations of the materials handling center 100. In one embodiment, the handling center data 148 includes locations of robotic systems 45 as well as data pertaining to the operation of the robotic systems 45.

The robotic systems 45 may include network-enabled devices that reposition items 25 on the Z-axis (as well as on the X-axis and Y-axis, if necessary) throughout the materials handling center 100. In various embodiments, the robotic systems 45 include, for example, processing circuitry 175, sensors 178, network interface 182, imaging device 185, as well as other components. The processing circuitry 175 may include hardware logic, or a combination of hardware and software logic, configured to control operation of the robotic system 45. In one embodiment, the processing circuitry 175 includes a microcontroller or similar device having at least one hardware processor. The processing circuitry 175 may control operation of the robotic system 45 as instructed by the robotic device control application 133, as may be appreciated.

The sensors 178 of the robotic system 45 may include, for example, location sensors, end effector sensors, weight sensors, RFID readers, as well as other sensors 178. The network interface 182 may include, for example, a device that enables the processing circuitry to communicate wirelessly over the network 118. To this end, the network interface 182 may include a wireless network card or adapter capable of communication over wireless fidelity (Wi-Fi), near field communication (NFC), Bluetooth®, ZigBee®, wireless local area network (WLAN), or other appropriate medium. The imaging device 185 may include a camera or other device capable of detecting identifiers 152 located on items 25, for example, to track items 25 as they progress along the conveyor system 10. In some embodiments, the imaging device 185 is mounted on an end effector 68 of the robotic system 45. In alternative embodiments, the imaging device 185 is external to the robotic system 45. For example, an imaging device 185 may be coupled at each exit point 20 to scan identifiers 152 as items 25 are diverted from the conveyor system 10.

The orders 109 may be generated by client devices coupled to the network 118. A client device may include, for example, a processor-based system such as a computer system. Such a computer system may be embodied in the form of a desktop computer, laptop computer, personal digital assistant, cellular telephone, smartphone, set-top box, music player, tablet computer system, game console, electronic book reader, or other device with like capability. The client device may include a display, such as a liquid crystal display (LCD) displays, gas plasma-based flat panel displays, organic light emitting diode (OLED) displays, electrophoretic ink (E ink) displays, LCD projectors, or other types of display devices, etc.

Next, a general description of the operation of the various components of the networked environment 112 is provided. To begin, materials handling center applications 130, such as the robotic device control application 133 and the item monitoring application 136, may execute to oversee the wholly- or partially-automated process of moving items 25 from one location of the materials handling center 100 to another or for sorting items 25. For instance, the materials handling center 100 may include one or more cameras or RFID readers that detect identifiers 152 on the items 25 to track the items 25 and maintain a current location 168 of the items 25 as they are sorted on a conveyor system 10. In some embodiments, the items 25 are tracked during fulfillment of orders 109 generated by the client devices through an electronic commerce system. In other embodiments, the items 25 may be tracked for unrelated materials handling center 100 operations.

The conveyor system 10 may include different item handling devices 30 or holding stations 40 at different locations where the items 25 may be laterally diverted off a conveyor belt 15 of the conveyor system 10 into one of the item handling devices 30 or holding stations 40. For instance, a destination location 162 for an item 25 may include a packing station 190 where the item 25 is packaged in fulfillment of an order 109. A particular item handling device 30, vertically-configured item handling device 50, or holding station 40 may receive items 25 intended for the packing station 190.

If an item 25 has reached, or is within a threshold time of reaching, a predetermined location on the conveyor system 10, the computing environment 115 may cause one or more laterally diverting mechanisms, such as the shoe diverting mechanisms 35 shown in FIG. 1, to laterally divert the item 25 from a conveyor belt 15 of the conveyor system 10. Laterally diverting the item 25 may include, for example, pushing, pulling, or otherwise forcing the item 25 along the X-axis. In some embodiments, the item 25 may be received directly by an item handling device 30, such as a chute shown in FIG. 1. In other embodiments, the item 25 may be received by a holding station 40, where the item 25 stays at rest to await handling by one of the robotic systems 45.

The computing environment 115 may assign a particular robotic system 45 to relocate an item 25 from a holding station 40 to one of the vertically-configured item handling devices 50. One of the robotic systems 45 may be assigned based at least in part on a location of a holding station 40, a weight of an item 25, the dimensions of the item 25, the speed of the conveyor system 10, the capabilities of the robotic system 45, as well as other criteria.

While the embodiments shown in FIGS. 2A, 2B, 3A, 3B, and 4 depict various types of robotic arms 55, in other embodiments, the robotic system 45 may include, for example, an elevator, escalator, angled conveyor belt 15, or other similar device. In instances where the robotic system 45 includes a robotic arm 55, the robotic arm 55 may have an end effector 68 capable of collecting an item 25, rotating the item 25, translationally displacing the item 25, or performing other appropriate movement to position the item 25 on one of the vertically-configured item handling devices 50. Additionally, the end effector 68 on a robotic arm 55 may be impactive, ingressive, astrictive, or contigutive. In some embodiments, the robotic arm 55 includes two end effectors 68, where each end effector 68 is capable of handling items 25 of varying weights or dimensions.

Prior to the item 25 being moved along the Z-axis, the computing environment 115 may cause the robotic system 45 to verify that that an object residing at a holding station 40 is an item 25 intended to be relocated. This may prevent items 25 unintentionally diverted from the conveyor belt 15 being moved to unintended locations. Relocating the item 25 using the robotic arm 55 may include, for example, causing the robotic arm 55 to navigate to a location of a holding station 40. For example, a robotic arm base 70 may be configured with one or more actuators to slide along a rail 75 to a location suitable to retrieve the item 25 from a holding station 40.

As the materials handling center 100 may include a multitude of robotic systems 45 having different capabilities, the computing environment 115 may identify an available and appropriate robotic system 45 to relocate the item 25 along the Z-axis. Additionally, the computing environment 115 may identify a vertically-configured item handling device 50 for receipt of the item 25. As shown above in FIGS. 2A, 2B, 3A, 3B, and 4, the vertically-configured item handling devices 50 may include ramps, chutes, or other vertically-configured item handling devices 50 positioned at different heights along the Z-axis. In these embodiments, the vertically-configured item handling devices 50 are tiered or stacked vertically to provide additional item handling space while occupying minimal floor space. Each of the vertically-configured item handling devices 50 may divert the item 25 to a different location in the materials handling center 100 or to different item handling devices 30, as may be appreciated.

The computing environment 115 may determine an appropriate vertically-configured item handling device 50 to relocate the item 25, for example, based at least in part on a destination location 162 for the item 25. In other embodiments, the computing environment 115 may determine an appropriate vertically-configured item handling device 50 based on the properties of the item 25, such as the weight 172 of the item 25 or the dimensions of the item 25.

Once a robotic system 45 is identified and assigned to relocate an item 25 along the Z-axis, the computing environment 115 may instruct the selected robotic system 45 to vertically divert the item 25 or, in other words, move the item 25 along the Z-axis to a predetermined vertically-configured item handling device 50. When an item 25 is placed on one of the vertically-configured item handling devices 50 by the robotic system 45, the item 25 may slide, roll, or otherwise move in a direction for collection or subsequent processing. For example, the items 25 may slide down one of the ramps into a respective one of the spirals 52, as shown in FIGS. 2A, 2B, 3A, and 3B.

Figure 7:
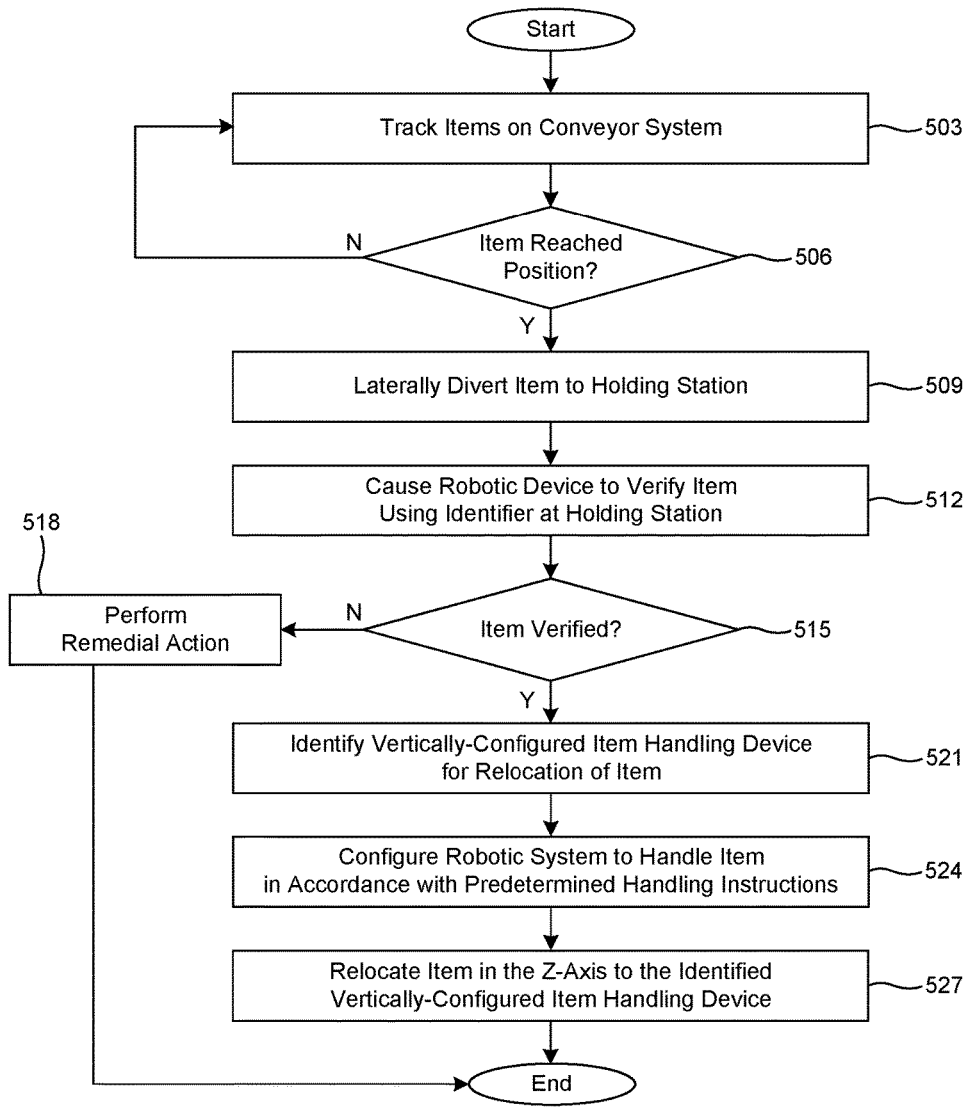
FIG. 7 is a flowchart illustrating one example of functionality implemented by materials handling center applications executed in a computing environment in the networked environment of FIG. 6 according to various embodiments of the present disclosure.

Referring next to FIG. 7, shown is a flowchart that provides one example of the operation of a portion of the material handling center applications 130, such as the robotic device control application 133 and the item monitoring application 136, according to various embodiments. It is understood that the flowchart of FIG. 7 provides merely an example of the many different types of functional arrangements that may be employed to implement the operation of the portion of the material handling center applications 130 as described herein. As an alternative, the flowchart of FIG. 7 may be viewed as depicting an example of elements of a method implemented in the computing environment 115 according to one or more embodiments.

Beginning with 503, items 25 may be tracked as they are moved and sorted on a conveyor system 10. In some embodiments, the items 25 are tracked during fulfillment of orders 109 generated over an electronic commerce system. In other embodiments, the items 25 may be tracked for placement in suitable inventory locations 106. Individual ones of the items 25 may bear one or more visual identifiers 152, such as bar codes, QR codes, matrix codes, or other similar visual identifiers 152. In other embodiments, the items 25 may have one or more RFID tags, or other similar form of identifiers 152. The conveyor system 10 may include one or more imaging devices or RFID readers that track items 25 as they progress through the conveyor system 10 by detecting the one or more identifiers 152 associated with the items 25. To this end, the computing environment 103 can maintain a current location 168 for each of the items 25 as they progress through the conveyor system 10.

In 506, a determination may be made whether an item 25 has reached a predetermined position along the conveyor system 10. For example, the item 25 may have reached (or is within a threshold time of reaching) an exit point 20 for a particular destination location 162, or other type of location that will progress the item 25 towards reaching the destination location 162. If the item 25 has not reached the desired position along the conveyor system 10, the process may revert to 503 to continue tracking items 25. However, if an item 25 has reached the predetermined position along the conveyor system 10, the process may proceed to 509.

In 509, the computing environment 115 may cause one or more devices, such as the shoe diverting mechanisms 35 shown in FIG. 1, to laterally divert the item 25 from a conveyor belt 15 of the conveyor system 10. Laterally diverting the item 25 may include, for example, pushing, pulling, or otherwise forcing the item 25 along the X-axis to an exit point 20. In some embodiments, the item 25 may be received directly by an item handling device 30, such as a chute shown in FIG. 1. In other embodiments, however, the item 25 may be positioned on a holding station 40, as shown in FIGS. 2A and 2B, to await handling by a robotic system 45.

The robotic system 45 may include components capable of relocating the item 25 from the holding station 40 to one of the vertically-configured item handling devices 50. To this end, the robotic system 45 may include, for example, an elevator, escalator, angled conveyor belt 15, or other similar device. In further embodiments, the robotic system 45 may include one or more robotic arms 55. For instance, a robotic arm 55 may have a suitable end effector 68 capable of collecting an item 25 while having the capability of rotating the item 25 or translationally displacing the item 25.

Next, in 512, the computing environment 115 may cause the robotic system 45 to verify that the item 25 residing at a holding station 40 such that items 25 are not moved to unintended locations or lost in the materials handling center 100. This may include, for example, causing a robotic system 45, such as a robotic arm 55, to navigate to a location of a holding station 40. A robotic arm base 70 may be configured with one or more actuators to slide along a rail 75 to retrieve items 25 at different holding stations 40 positions along the conveyor system 10. The robotic system 45 may be positioned in an overhead arrangement mounted above the conveyor system 10 or, in other embodiments, the robotic system 45 may be positioned adjacent to the conveyor system 10 or at another suitable location.

In 515, a determination is made whether the item 25 residing at the holding station 40 has been verified. Verification may include, for example, using an imaging device 185 of the robotic system 45 to capture an image of an identifier 152 on the item 25 and query the data store 121 to determine whether the identifier 152 corresponds to the item 25.

If the item 25 is not verified or, in other words, the item 25 residing at the holding station 40 is not the item 25 intended for relocation, the process may proceed to 518 where a remedial action may be performed. In one embodiment, the robotic system 45 may be instructed to laterally divert the item 25 back to the conveyor belt 15 of the conveyor system 10. In other embodiments, an alert may be generated that causes personnel of the materials handling center 100 to come inspect the item 25 or relocate the item 25. In further embodiments, the item 25 may be relocated to a loop or recirculation conveyor that moves the item 25 back to an appropriate portion of the conveyor system 10. Thereafter, the process may proceed to completion.

Referring back to 515, assuming the item 25 is verified or, in other words, the item 25 residing at the holding station 40 is an item 25 intended for relocation, the process may proceed to 521. In 521, the computing environment 115 may identify one of a multitude of vertically-configured item handling devices 50 for relocation of the item 25. As shown above in FIGS. 2A, 2B, and 3, the vertically-configured item handling devices 50 may include ramps, chutes, or other item handling devices 30 positioned at different heights along the Z-axis. In some embodiments, the vertically-configured item handling devices 50 are tiered or stacked vertically to provide additional item handling and sortation while occupying minimal floor space. Each of the vertically-configured item handling devices 50 may divert the item 25 to a different location in the materials handling center 100 or to different item handling devices 30, as may be appreciated.

In one embodiment, the computing environment 115 may determine an appropriate vertically-configured item handling device 50 to relocate the item 25, for example, based at least in part on a destination location 162 for the item 25. In other embodiments, the computing environment 115 may determine an appropriate vertically-configured item handling device 50 based on the properties of the item 25, such as the weight 172 of the item 25 or the dimensions of the item 25.

Moving along, in 524, the robotic system 45 may be configured to handle the item 25 residing at the holding station 40 in accordance with one or more predetermined handling instructions. For instance, given the weight 172 of the item 25 or the dimension of the item 25, the item 25 may be collected in a particular fashion by an end effector 68 or other device of the robotic system 45. For example, items 25 having a weight above a threshold may be collected by placing an end effector projection underneath a bottom of the item 25. Items 25 having a weight below the threshold may be collected by gripping the item 25 from its sides using a gripper or similar type of end effector 68. In further embodiments, different robotic systems 45 may be employed to collect different types of items 25 based at least in part on the weight 172 of the items 25, the dimensions of the items 25, or other factors.

In 527, the item 25 may be vertically relocated along the Z-axis to the vertically-configured item handling device 50 identified in 521. As may be appreciated, the item 25 may be vertically relocated by the robotic system 45 in accordance with the predetermined handling instructions. When an item 25 is placed on one of the vertically-configured item handling devices 50 by the robotic system 45, the items 25 may slide, roll, or otherwise move in a direction for collection or subsequent processing. For example, the items 25 may slide down one of the ramps into a respective one of the spirals 52, as shown in FIGS. 2A and 2B. Thereafter, the process may proceed to completion.

Figure 8:
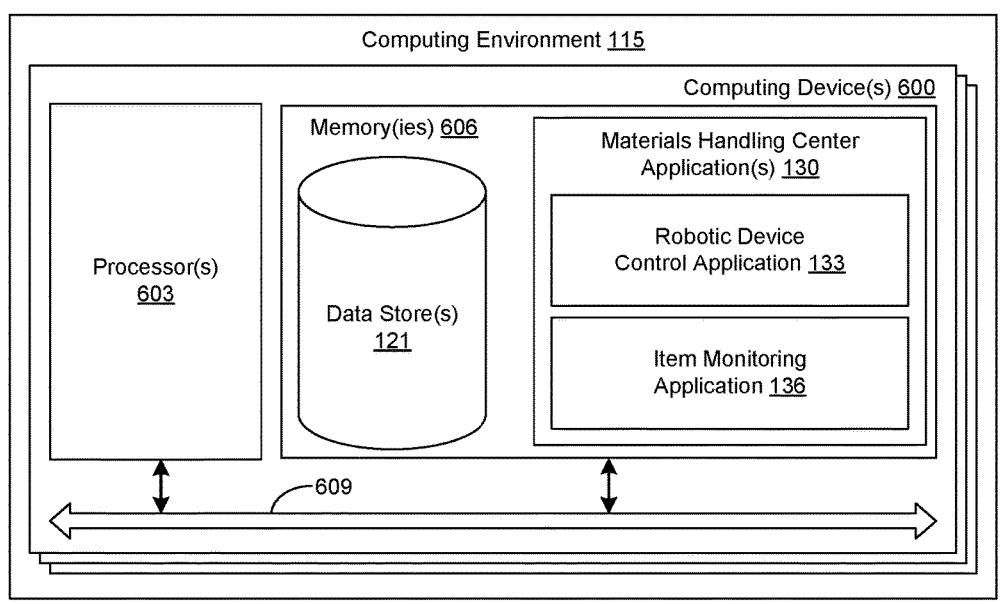
FIG. 8 is a schematic block diagram that provides one example illustration of a computing environment employed in the networked environment of FIG. 6 according to various embodiments of the present disclosure.

With reference to FIG. 8, shown is a schematic block diagram of the computing environment 115 according to an embodiment of the present disclosure. The computing environment 115 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the materials handling center applications, the robotic device control application 133, the item monitoring application 136, and potentially other applications. Also stored in the memory 606 may be a data store 121 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the materials handling center applications, the robotic device control application 133, the item monitoring application 136, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 7 shows the functionality and operation of an implementation of portions of the materials handling center applications, such as the robotic device control application 133 and the item monitoring application 136. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart of FIG. 7 shows a specific order of execution, it is understood that the order of execution may differ from that which is depicted. For example, the order of execution of two or more blocks may be scrambled relative to the order shown. Also, two or more blocks shown in succession in FIG. 7 may be executed concurrently or with partial concurrence. Further, in some embodiments, one or more of the blocks shown in FIG. 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the materials handling center applications, the robotic device control application 133, and the item monitoring application 136, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the materials handling center applications, the robotic device control application 133, and the item monitoring application 136, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices in the same computing environment 115.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    a conveyor system configured to move a plurality of items on a conveyor belt;
    a lateral diverting mechanism configured to laterally divert individual ones of the plurality of items from the conveyor belt to a respective one of a plurality of holding stations positioned along the conveyor system; and
    a robotic arm mounted above or lateral to the conveyor system, the robotic arm comprising processing circuitry in data communication with a computing environment to at least:
        perform a verification of one of the plurality of items at the respective one of the plurality of holding stations;
        collect the one of the plurality of items at the respective one of the plurality of holding stations using an end effector; and
        vertically relocate the one of the plurality of items along a vertical axis for placement in one of a plurality of vertically-configured item handling devices, wherein the plurality of vertically-configured item handling devices comprise a first vertically-configured item handling device and a second vertically-configured item handling device, the second vertically-configured item handling device having a height different than the first vertically-configured item handling device and overlapping a substantial portion of the first vertically-configured item handling device.

2. The system of claim 1, wherein the lateral diverting mechanism is at least one of: a shoe diverting mechanism, a pop-up-steering-wheel diverting mechanism, a tilt tray diverting mechanism, a push-up arm diverting mechanism, a roller belt diverting mechanism, a cross belt diverting mechanism, a right angle transfer, a steering wheel diverting mechanism, a swing arm diverting mechanism, a pusher diverting mechanism, or a modular belt diverting mechanism.

3. The system of claim 1, wherein the holding station comprises a level platform configured to retain the one of the plurality of items in a resting state to await collection by the robotic arm.

4. A system, comprising:
a conveyor system configured to move a plurality of items on a conveyor belt;
a plurality of vertically-configured item handling devices, wherein individual ones of the plurality of vertically-configured item handling devices have a different offset from a holding station, the plurality of vertically-configured item handling devices comprising a first vertically-configured item handling device and a second vertically-configured item handling device, wherein the second vertically-configured item handling device has a height different than the first vertically-configured item handling device and overlaps a substantial portion of the first vertically-configured item handling device; and
a robotic system mounted above or adjacent to the conveyor system, the robotic system being configured to at least:
collect at least one of the plurality of items at the holding station; and
move the at least one of the plurality of items along a vertical axis for placement in one of the plurality of vertically-configured item handling devices.

5. The system of claim 4, wherein the holding station comprises a level platform configured to retain the at least one of the plurality of items in a resting state to await collection by the robotic system.

6. The system of claim 4, wherein the robotic system is a robotic arm, the robotic arm being articulated and electromechanical.

7. The system of claim 6, wherein:
the robotic system comprises a rail mounted above at least a portion of the conveyor system; and
the robotic system comprises a robotic arm base coupled to the rail being configured to move the robotic arm along the rail from a first position to a second position.

8. The system of claim 4, further comprising a lateral diverting mechanism configured to laterally divert individual ones of the plurality of items from the conveyor belt to individual ones of a plurality of holding stations positioned along the conveyor system.

9. The system of claim 8, wherein the lateral diverting mechanism is at least one of: a shoe diverting mechanism, a pop-up-steering-wheel diverting mechanism, a tilt tray diverting mechanism, a push-up arm diverting mechanism, a roller belt diverting mechanism, a cross belt diverting mechanism, a right angle transfer, a steering wheel diverting mechanism, a swing arm diverting mechanism, a pusher diverting mechanism, or a modular belt diverting mechanism.

10. The system of claim 4, wherein the robotic system is further configured to perform a verification of one of the plurality of items at the respective one of the plurality of holding stations.

11. The system of claim 10, wherein the verification is performed based at least in part on an identifier captured using an imaging device.

12. The system of claim 4, wherein the robotic system is in data communication with a computing environment over a network.

13. The system of claim 12, wherein:
the robotic system is one of a plurality of robotic systems; and
the computing environment is configured to identify the robotic system from the plurality of robotic systems and assign the robotic system to collect the at least one of the plurality of items at the respective one of the plurality of holding stations.

14. The system of claim 13, wherein the robotic system is identified from the plurality of robotic systems based at least in part on at least one of: a location of the respective one of the plurality of holding stations, a weight of the at least one of the plurality of items, a dimension of the at least one of the plurality of items, or a speed of the conveyor system.

15. The system of claim 13, wherein the robotic system comprises a gantry robotic arm.

16. A method, comprising:
tracking, by at least one computing device comprising at least one hardware processor, a plurality of items progressing on a conveyor system;
causing, by the at least one computing device, a lateral diverting mechanism to divert at least one of the plurality of the items from the conveyor system to a holding station; and
causing, by the at least one computing device, a robotic system in data communicating with the at least one computing device to:
collect the at least one of the plurality of items from the holding station; and
move the at least one of the plurality of items along a vertical axis for placement in one of a plurality of vertically-configured item handling devices, wherein the plurality of vertically-configured item handling devices comprises a first vertically-configured item handling device and a second vertically-configured item handling device, wherein the second vertically-configured item handling device has a height different than the first vertically-configured item handling device and overlaps a substantial portion of the first vertically-configured item handling device.

17. The method of claim 16, further comprising configuring, by the at least one computing device, the robotic system to handle the at least one of the plurality of items based at least in part on at least one of: a weight of the at least one of the plurality of items or a dimension of the at least one of the plurality of items.

18. The method of claim 16, further comprising causing, by the at least one computing device, the robotic system to relocate from a first position to a second position, the second position being near the holding station.

19. The method of claim 16, wherein the holding station comprises a level platform configured to retain the at least one of the plurality of items in a resting state to await collection by the robotic system.

20. The method of claim 16, wherein the robotic system is one of a plurality of robotic systems.

21. The method of claim 20, further comprising:
identifying, by the at least one computing device, the robotic system from the plurality of robotic systems; and
assigning, by the at least one computing device, the robotic system to collect the at least one of the plurality of items at the holding station.

22. The method of claim 21, wherein the robotic system is identified from the plurality of robotic systems based at least in part on at least one of: a location of the holding stations, a weight of the at least one of the plurality of items, a dimension of the at least one of the plurality of items, or a speed of the conveyor system.

* * * * *